(12) United States Patent
Schulz et al.

(10) Patent No.: US 7,627,065 B2
(45) Date of Patent: Dec. 1, 2009

(54) GENERATING A CLOCK CROSSING SIGNAL BASED ON CLOCK RATIOS

(75) Inventors: Jurgen M. Schulz, Pleasanton, CA (US); Bharat K. Daga, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 771 days.

(21) Appl. No.: 11/316,498

(22) Filed: Dec. 21, 2005

(65) Prior Publication Data

US 2007/0140394 A1    Jun. 21, 2007

(51) Int. Cl.
*H04L 7/00* (2006.01)
(52) U.S. Cl. ...................................... 375/354
(58) Field of Classification Search ............... 375/354, 375/355, 359, 371–376, 224, 226; 714/724, 714/738, 744; 327/100, 141, 144, 146, 147, 327/151, 152, 154–156, 160, 162
See application file for complete search history.

(56) References Cited

U.S. PATENT DOCUMENTS

| | | | |
|---|---|---|---|
| 5,661,732 A | 8/1997 | Lo et al. |
| 5,825,785 A | 10/1998 | Barry et al. |
| 5,982,189 A | 11/1999 | Motika et al. |
| 5,987,635 A | 11/1999 | Kishi et al. |
| 6,085,346 A | 7/2000 | Lepejian et al. |
| 6,148,426 A | 11/2000 | Kim et al. |
| 6,205,564 B1 | 3/2001 | Kim et al. |
| 6,249,893 B1 | 6/2001 | Rajsuman et al. |
| 6,330,645 B1 | 12/2001 | Harriman |
| 6,442,723 B1 | 8/2002 | Koprowski et al. |
| 6,560,740 B1 | 5/2003 | Zuraski, Jr. et al. |
| 6,587,979 B1 | 7/2003 | Kraus et al. |
| 6,603,706 B1 | 8/2003 | Nystuen et al. |
| 6,636,997 B1 | 10/2003 | Wong et al. |
| 6,654,920 B1 | 11/2003 | Hetherington et al. |
| 6,658,611 B1 | 12/2003 | Jun |
| 6,658,617 B1 | 12/2003 | Wong |
| 6,661,266 B1 | 12/2003 | Variyam et al. |
| 6,665,828 B1 | 12/2003 | Arimilli et al. |
| 6,671,838 B1 | 12/2003 | Koprowski et al. |
| 6,681,337 B1 | 1/2004 | Smith et al. |
| 6,681,359 B1 | 1/2004 | Au et al. |
| 6,684,358 B1 | 1/2004 | Rajski et al. |
| 6,819,730 B2 | 11/2004 | He |
| 6,901,543 B2 | 5/2005 | Dorsey |
| 6,918,016 B1 | 7/2005 | Magro |
| 6,981,191 B2 | 12/2005 | Dorsey |
| 6,996,760 B2 | 2/2006 | Dorsey |

(Continued)

FOREIGN PATENT DOCUMENTS

EP    0848329    6/1998

*Primary Examiner*—Mohammad H Ghayour
*Assistant Examiner*—Vineeta S Panwalkar
(74) *Attorney, Agent, or Firm*—Rory D. Rankin; Meyertons Hood Kivlin Kowert & Goetzek, P.C.

(57) ABSTRACT

A multiple clock domain system. A system comprises two clock domains which receive a source clock signal. The first domain includes a first clock signal with a first frequency and the second domain includes a second clock signal with a second frequency. A ratio of the first frequency to the second frequency is N:M. The first domain is configured to initialize a count to N, if N is less than 2*M; and initialize the count to M, if N is not less than 2*M. Subsequently, on each cycle of the first clock signal, the first domain adds (M-N) to the count and asserts a sample enable signal, if the count is greater than or equal to N; and adds a value equal to M to the count and negates the sample enable signal, if the count is not greater than or equal to N.

20 Claims, 4 Drawing Sheets

U.S. PATENT DOCUMENTS

| | | | |
|---|---|---|---|
| 7,076,014 B2 * | 7/2006 | Roberts et al. | 375/356 |
| 2001/0043098 A1 * | 11/2001 | Locker et al. | 327/156 |
| 2003/0074617 A1 | 4/2003 | Dorsey | |
| 2003/0074618 A1 | 4/2003 | Dorsey | |
| 2003/0074619 A1 | 4/2003 | Dorsey | |
| 2004/0012577 A1 | 1/2004 | Naegle et al. | |

* cited by examiner

GENERATING A CLOCK CROSSING SIGNAL BASED ON CLOCK RATIOS

BACKGROUND OF THE INVENTION

1. Limited Copyright Waiver

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005.

2. Field of the Invention

This invention relates to multi-clock domain digital data communication and, more particularly, to determining when new data may be sampled in a clock domain.

3. Description of the Related Art

New techniques to ensure the reliability of the communication of digital data have become necessary as the speed of communication links has increased. Particularly within computer memory systems, a reference clock may accompany parallel digital data so as to provide a mechanism for determining the appropriate time to sample the data. However, it is often the case that multiple clock domains are established within a given communications system due to the difficulties involved in distributing a single clock throughout a large system. Although the clocks of each individual clock domain may or may not have the same frequency, it is to be expected that the phase relationship between any two clocks in different domains will vary depending on changes in voltages and temperature between the domains over time. Jitter in the phase offset between a transmitting clock and a receiving clock tends to move the sampling point away from the ideal point in the received data signal, resulting in poor timing margins and/or a higher bit-error-rate (BER). The higher the speed at which a communications link is clocked, the more significant the effects of phase jitter become. In addition, if the ratio of the clock frequencies across a given boundary is not an integral multiple, determining when the respective clocks are aligned can be difficult. Therefore, it is desirable to have a mechanism to determine when to sample the data across a clock boundary while maintaining a robust timing margin thereby reducing the impact of phase changes between clock domains and enabling higher communication speeds.

In some cases, in order to reduce latency, multi-clock domains may generate multiple clock signals which are derived from a common source clock. While various approaches may be utilized to determine when data may be sampled within a given clock domain, such determinations may become fairly complex, or require unique individual solutions, for a variety of clock ratios. Accordingly, an efficient method and mechanism for determining when data may be sampled in domains of a multi-clock domain system are desired.

SUMMARY OF THE INVENTION

Various embodiments methods and mechanisms in a data communications system are contemplated. In one embodiment, a data communications system comprises two clock domains across which communications may occur. A first clock domain includes a first clock signal, and a second clock domain includes a second clock signal. In one embodiment, the first clock signal and the second clock signal are derived from a common source and have different frequencies. Data transfers may occur across the clock domain.

The first clock domain includes a first clock signal with a first frequency and the second clock domain includes a second clock signal with a second frequency, each of the first clock signal and the second clock signal are derived from the source clock signal. In one embodiment, a ratio of the first frequency to the second frequency is N:M. The first clock domain is configured to initialize a count to N, in response to detecting N is less than 2*M. Alternatively, the first domain may initialize the count to M, in response to detecting N is not less than 2*M. Subsequently, on each cycle of the first clock signal, the first domain is configured to add a value equal to (M−N) to the count and assert a sample enable signal, in response to determining the count is greater than or equal to N. If on a cycle of the first clock signal it is determined that the count is not greater than or equal to N, the count is increased by a value equal to M and sample enable signal is negated. Assertion of the sample enable signal indicates the first clock domain may sample new data for transfer to the second clock domain. Negation of the sample enable signal indicates the first clock domain should hold its data so that the second clock domain may capture the data.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
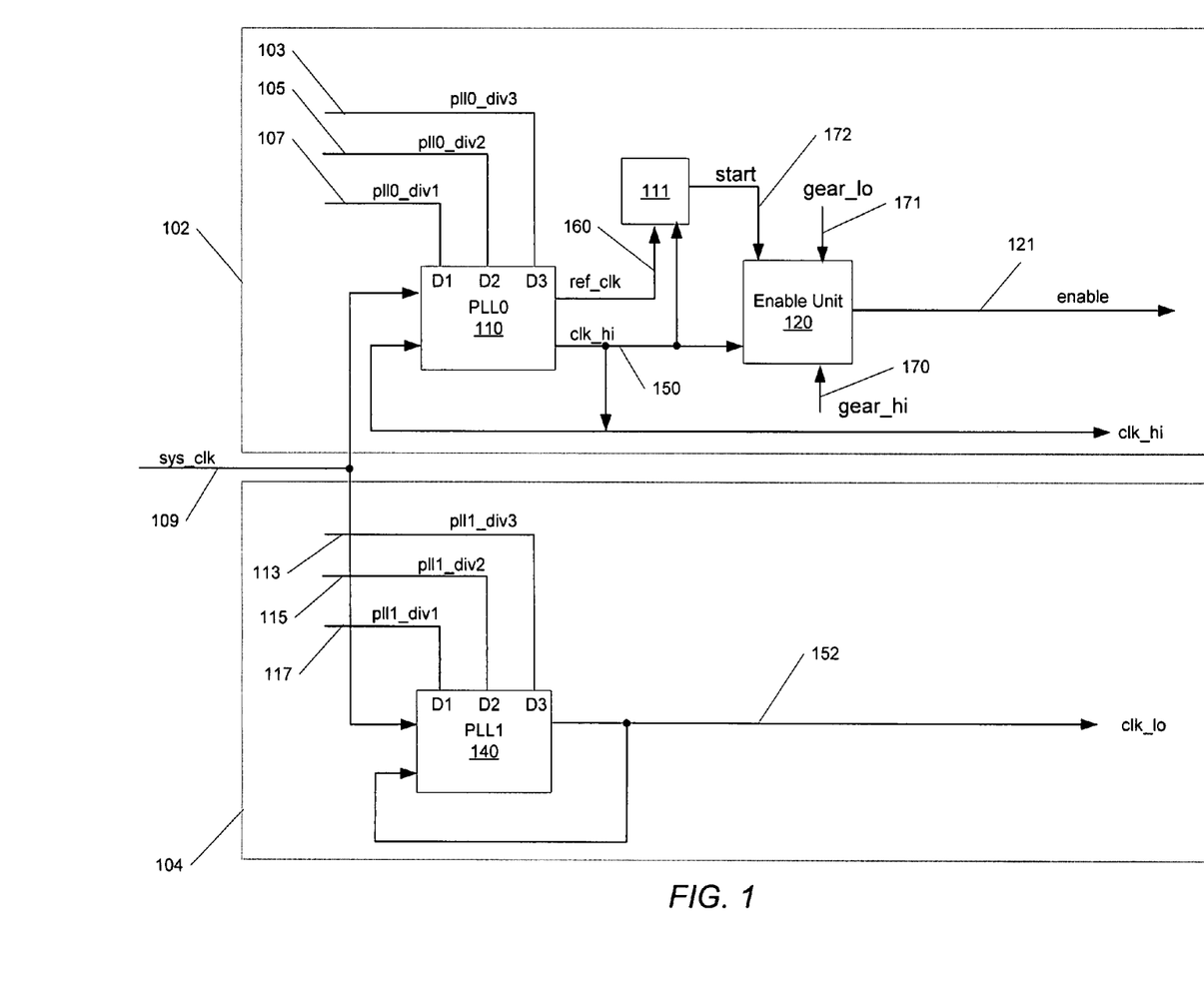
FIG. 1 depicts one embodiment of a system including two clock domains.

FIG. 1 illustrates one embodiment of a system which includes multiple clock domains. In the example shown, a first clock domain is depicted as block 102 and a second clock domain is depicted as block 104. Within each of the domains 102 and 104, circuitry is included which is configured to generate a clock signal within the respective domain. For example, domain 102 includes circuitry configured to generate clk_hi 150, and domain 104 includes circuitry configured to generate clk_lo 152. As depicted in FIG. 1, each domain 102 and 104 receives a common source clock signal sys_clk 109.

In one embodiment, both clk_hi 150 and clk_lo 152 may be derived from the common clock source sys_clk 109. The sys_clk 109 may be used to generate a reference clock signal, ref_clk 160, and each of clk_hi 150 and clk_lo 152 may be multiples of ref_clk 160. In one embodiment, clk_hi 150 is N×ref_clk 160, and clk_lo 152 is M×ref_clk 160. Consequently, a rising edge of clk_hi 150 will align with a rising edge of ref_clk 160 every N cycles of clk_hi 150, and a rising edge of clk_lo 152 will align with a rising edge of ref_clk 160 every M cycles of clk_lo 152. Further, the ratio of clk_hi 150 to clk_lo 152 in such an embodiment may be N:M. In an embodiment wherein data and/or signals cross between clock domain 102 and clock domain 104, it may be necessary to determine when clk_hi 150 and clk_lo 152 are aligned. However, given clk_hi 150 and clk_lo 152 may have different frequencies, determining when both clock signals are aligned may pose some difficulty. In particular, when the frequency of one clock signal to another is not an integral multiple, the difficulty of determining when a rising edge of one clock signal is aligned with the other may be increased.

FIG. 1 illustrates one embodiment of a system configured to generate an enable signal 121 which when asserted indicates that clk_hi 150 may sample new data. When enable 121 is not asserted, data is held so that clk_lo 152 may sample the data. In the embodiment shown, each clock domain 102 and 104 includes a phase locked loop (PLL) for use in generating clock signals. Domain 102 includes a PLL0 110 coupled to receive sys_clk 109, and domain 104 includes PLL1 140 coupled to receive sys_clk 109. Each of PLL0 110 and PLL1 140 are configured to generate clock signals which are derived from sys_clk 109. It is to be understood that a variety of ways of generating clock signals from a source clock signal are possible and are contemplated. The examples described herein are intended to be illustrative and are not intended to be limited to the particular examples provided. One embodiment of a hardware description language configured to generate an enable signal for clock crossing boundaries is depicted in the accompanying Appendix.

In the example shown in FIG. 1, each of PLL0 110 and PLL1 140 are programmable. For example, PLL0 110 is programmable via signals pll0_div1 107, pll0_div2 105, and pll0_div3 103. Similarly, PLL1 140 may be programmable via signals pll1_div1 117, pll1_div2 115, and pll1_div3 113. Based upon values of these signals, the respective PLL may generate a clock signal with a different frequency. As illustrated, PLL0 110 is configured to generate ref_clk signal 160 and clk_hi 150. Clock signal clk_hi 150 may then be used as a clock source for other circuitry (including circuitry and components not shown) within domain 102. In a similar manner, PLL1 140 generates a signal clk_lo 152 that may be used within domain 104. Further, ref_clk 160 and clk_hi 150 are shown coupled to block 111 which conveys start signal 172 to enable unit 120.

In addition to the above, domain 102 further includes enable unit 120 coupled to receive clk_hi 150, and which is configured to generate enable signal 121 which may be used to indicate when clk_hi 150 may sample new data. Enable unit 120 is further coupled to receive signals gear_hi 170, gear_lo 171, and start 172. Signals gear_hi 170 and gear_lo 171 are indicative of a ratio of clk_hi 150 to clk_lo 152, respectively. For example, if clk_hi 150 has a frequency of 500 MHz and clk_lo 152 has a frequency of 333 MHz, then the ratio of clk_hi 150 to clk_lo 152 would be 3:2. Accordingly, in one embodiment, gear_hi 170 may have a value equal to three, while gear_lo 171 has a value equal to two.

In one embodiment, enable unit 120 is configured to assert enable signal 121 at least once for each cycle of clk_lo 152. More generally, enable unit 120 is configured to assert enable signal 121 for every slow clock cycle (e.g., clk_lo 152) given any two clocks signals (e.g., clk_hi 150 and clk_lo 152) which are derived from a common clock source. In one embodiment, each of clk_hi 150 and clk_lo 152 represent multiples of ref_clk 160. Accordingly, while each of clk_hi 150 and clk_lo 152 may have different frequencies, it may be known that they will be aligned each rising edge of ref_clk 160. In one embodiment, start signal 172 is asserted to indicate a rising edge of ref_clk 160 is detected or immediately follows, as will be discussed further below. Accordingly, block 111 may comprise a counter or other logic which detects a rising edge of ref_clk 160 and counts cycles of clk_hi 150 to determine when a next rising edge of ref_clk 160 will occur. In this manner, start signal 172 may be asserted at a predetermined time within a given cycle of ref_clk 160. Other techniques for generating start signal 172 are possible and are contemplated.

In response to detecting the assertion of start signal 172, enable unit 120 is configured to load count values for use in determining when enable signal 121 should be asserted. The actual counts which are loaded are dependent upon the ratio of clk_hi 150 to clk_lo 152. Subsequently, on each cycle of clk_hi 150, it is determined whether the enable signal 121 is to be asserted. In this manner, clock domain 102 may determine when new data may be sampled and when data should be held for sampling by domain 104. It is noted that while the detection of a rising edge are described herein, those skilled in the art will appreciate that the methods and mechanisms described herein may be modified to detect and utilize falling edges in alternative embodiments. All such alternatives are contemplated.

Figure 2:
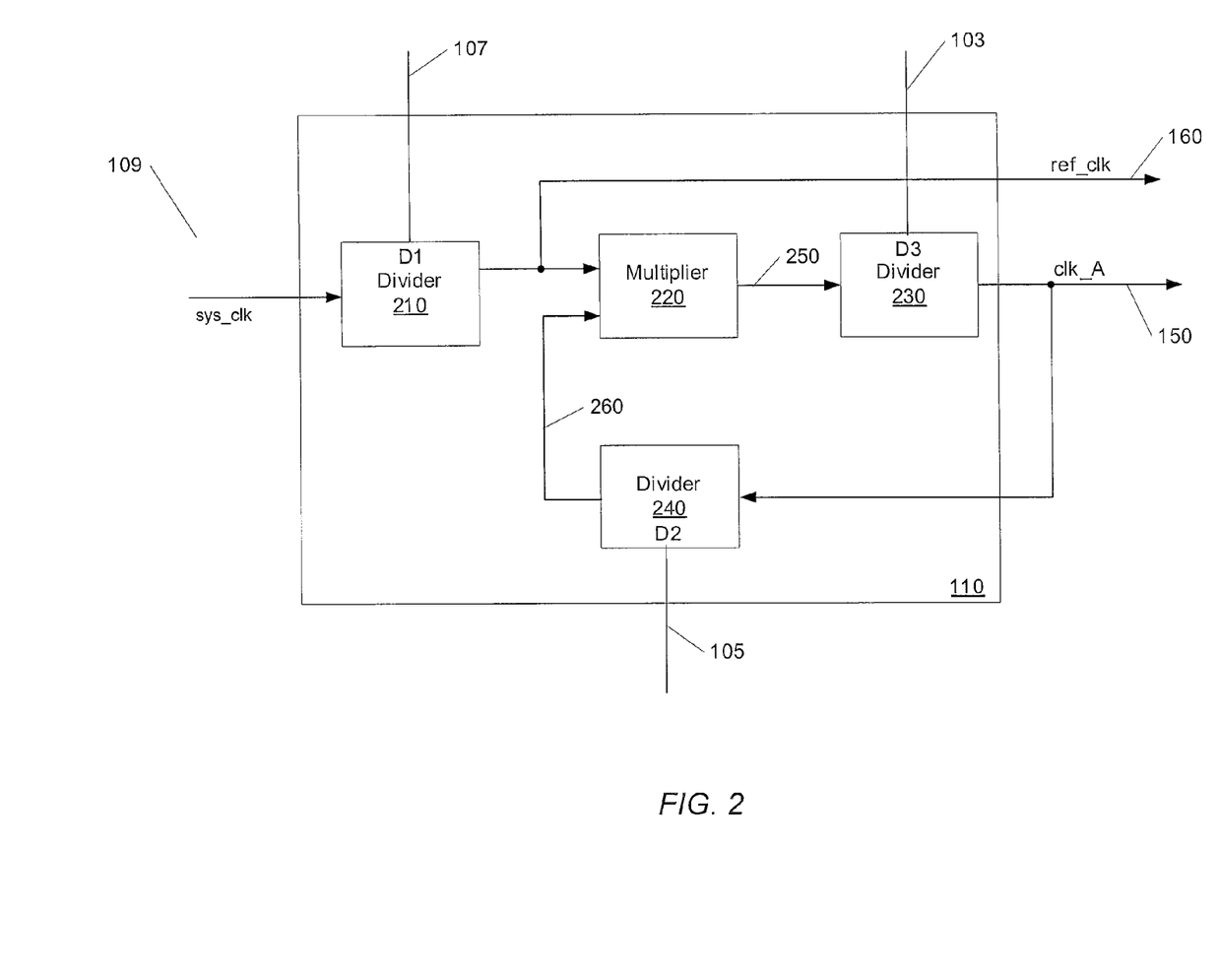
FIG. 2 illustrates one embodiment of a phase locked loop.

FIG. 2 depicts one embodiment of PLL0 110. PLL1 140 may be similarly configured. However, as noted above, numerous alternative confirmations are possible and are contemplated. In the example shown, PLL0 110 includes frequency divider circuits 210, 230, and 240. Also includes is commonly utilized PLL circuitry 220 which may include a phase frequency detector, low pass filter, voltage controlled oscillator, and/or other suitable circuitry. In one embodiment, circuit 210 is configured to divide a received sys_clk 109 by a value indicated by signal 107 (D1). For example, circuit 210 may divide sys_clk 109 by two to generate a ref_clk 160 which is half the frequency of sys_clk 109. Circuitry 220 is coupled to receive ref_clk 160 and multiply the received clock signal 160 by a factor of N as described above to generate a clock signal 250. Circuitry 230 may then be configured to divide clock signal 250 by a value indicated by signal 103 (D3). Assuming, for purposes of discussion, that circuit 230 performs a divide by one, clock signal 250 generally represents clk_hi 150. The signal clk_hi 150 may then be fed back into circuit 220 to generate a phase locked signal. In the embodiment shown, clk_hi 150 may be fed back via a frequency divider circuit 240 which may first divide the frequency of clk_hi 150 prior to feeding it back in to circuit 240 as clock signal 260. For example, in one embodiment, circuit 240 may be programmed via signal 105 (D2) to perform a division by two.

Figure 3:
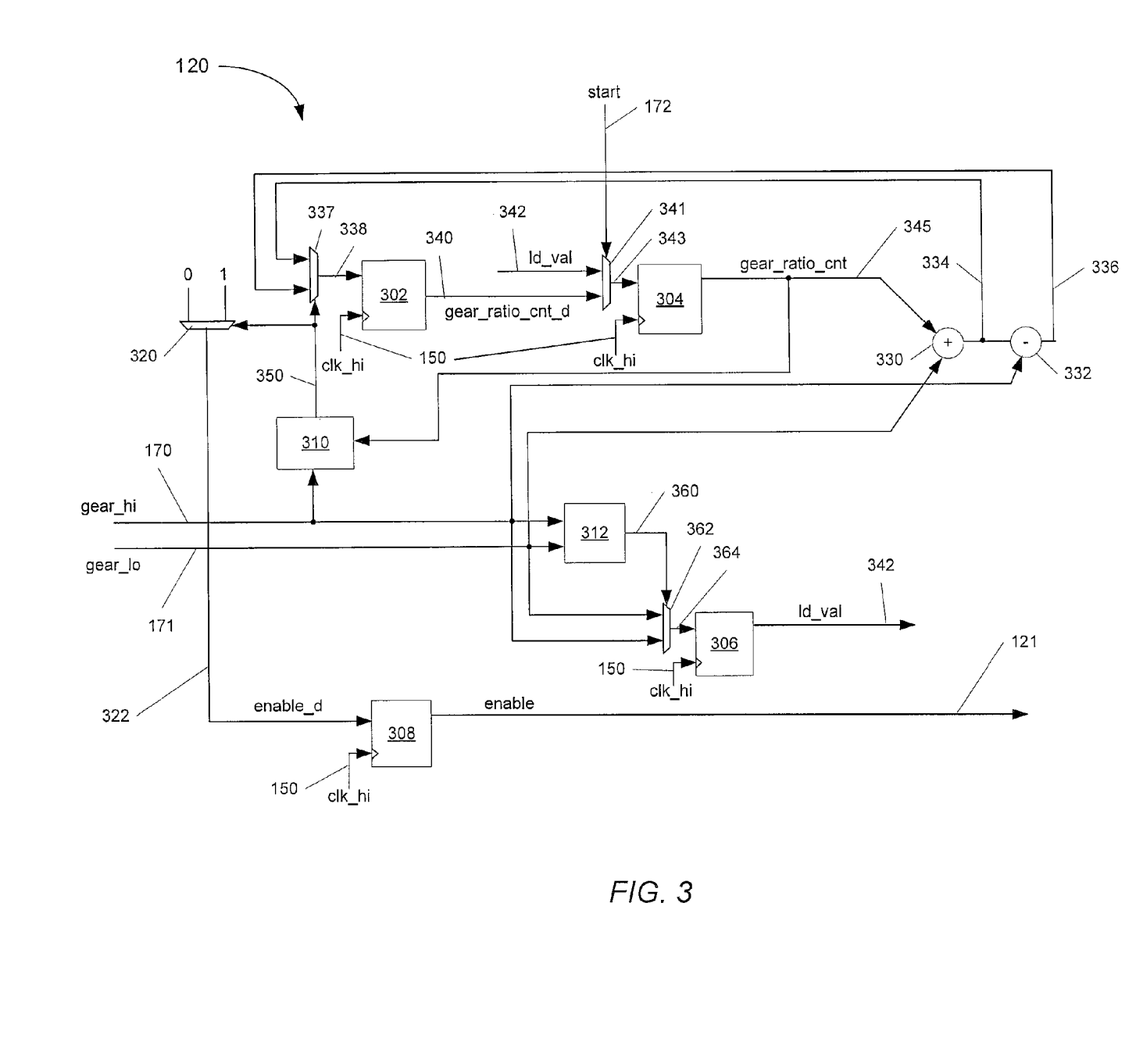
FIG. 3 illustrates one embodiment of circuitry configured to generate an alignment related signal.

Turning now to FIG. 3, one embodiment of enable unit 120 is shown. As shown, the circuitry depicted is coupled to receive start signal 172, gear_hi 170, gear_lo 171, and clk_hi 150. The embodiment shown includes flip-flops 302, 304, 306, and 308, each of which are coupled to receive clk_hi 150. Flip-flops 302, 304, 306 and 308 may also be resetable via an appropriate signal (not shown). Signals gear_hi 170 and gear_lo 171 are coupled to logic block 312, which conveys a select signal 360 to multiplexer 362. In one embodiment, block 312 determines whether the value of gear_hi 170 is less than twice the value of gear_lo 171. If so, select signal 360 conveys gear_hi 170 as signal 364. Otherwise, gear_lo 171 is conveyed as signal 364. Multiplexer 362 receives as inputs gear_hi 170 and gear_lo 171 and conveys one of these signals as multiplexer output 364. Flip-flop 306 is configured to capture input 364 on an edge of clk_hi 150. The state of flip-flop 306 is represented by ld_val 342. The signal ld_val 342 is also an input to multiplexer 341.

As shown, multiplexer 341 conveys as output 343 either ld_val 342 or gear_ratio_cnt_d 340, depending upon the value of start signal 173. The state of flip-flop 304 is represented by gear_ratio_cnt 345, which is coupled as input to adder 330 and block 310. Adder 330 sums gear_ratio_cnt 345 and gear_lo 171, and conveys the sum 334 as an input to both multiplexer 337 and subtractor 332. Subtractor 332 subtracts gear_hi 170 from sum 334, and conveys the result 336 as input to multiplexer 337. The output 338 of multiplexer 337 is captured by flip-flop 302, whose state is represented by gear_ratio_cnt_d 340. Accordingly, the input to flip-flop 302 is either (i) gear_ratio_cnt 345+gear_lo 171; or (ii) gear_ratio_cnt 345+gear_lo 171–gear_hi 170, depending upon the value of select signal 350 which is conveyed from block 310.

In one embodiment, block 310 is configured to compare a value of gear_ratio_cnt 345 to gear_hi 170. If gear_ratio_cnt 345 is greater than or equal to gear_hi 170, then signal 350 selects signal 336 for conveyance from multiplexer 337 and selects a logic "1" for conveyance from multiplexer 320 as signal 322. Otherwise, signal 334 is selected for conveyance from multiplexer 337 and logic "0" is selected for conveyance as enable_d signal 322. The signal enable_d 322 serves as data input to flip-flop 308 and the state of flip-flop 308 is conveyed as enable signal 121. As discussed above, enable signal 121 when asserted indicates new data may be sampled by clk_hi 170 within clock domain 102.

Figure 4:
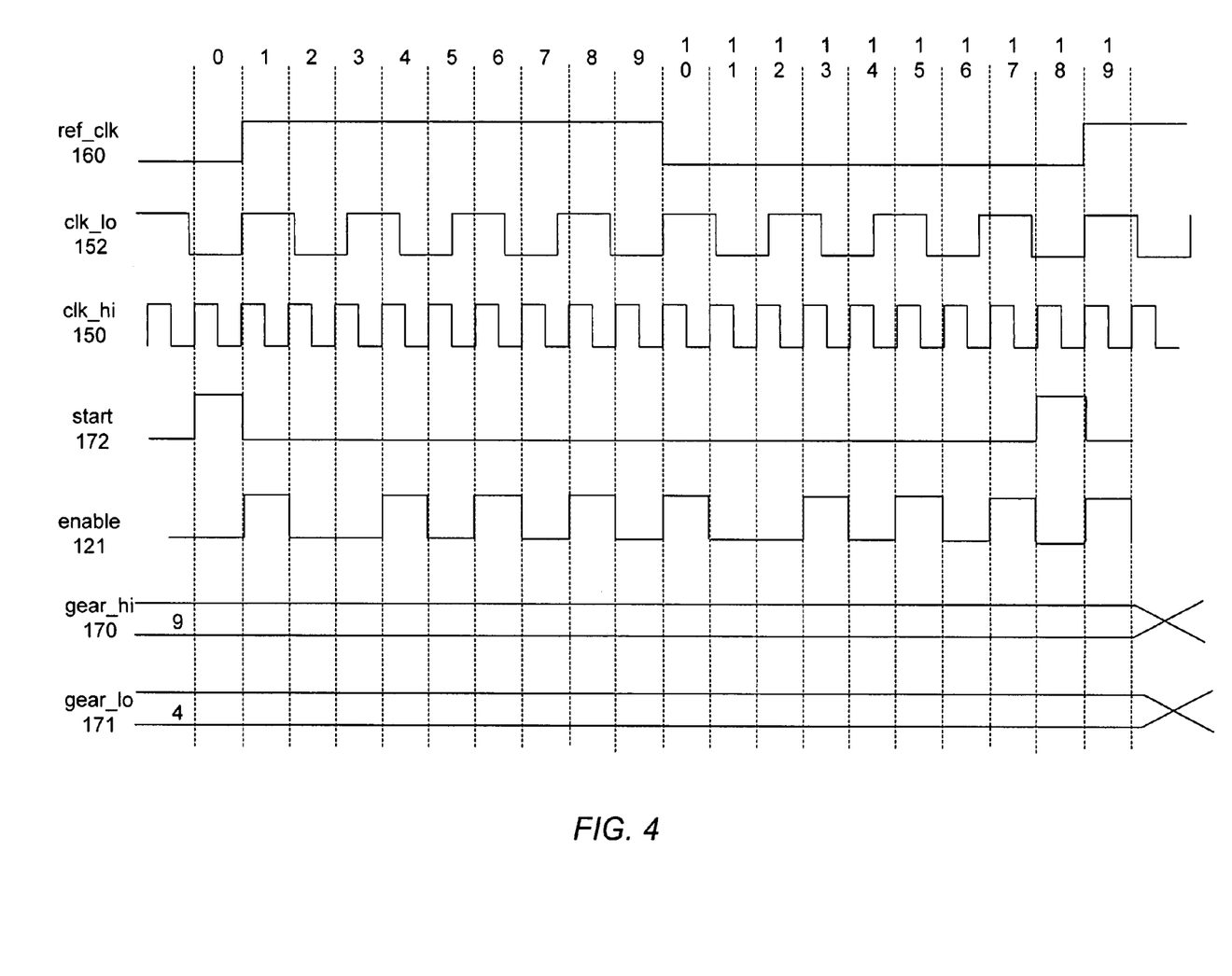
FIG. 4 depicts one embodiment of a timing diagram.

For ease of discussion, operation of the enable unit 120 of FIG. 3 will be described by reference to FIG. 4. FIG. 4 illustrates an embodiment wherein a ratio of clk_hi 150 to clk_lo 152 is 9:4. Accordingly, gear_hi 170 is shown to have a value of 9, and gear_lo 171 is shown to have a value of 4. The values stored within gear_hi 170 and gear_lo 171 may be programmatically stored, dynamically determined from the clock ratios themselves, or otherwise. Illustrated in the signal traces of FIG. 4 are ref_clk 10, clk_lo 152, clk_hi 150, start 172, enable 121, gear_hi 170, and gear_lo 171. In addition, traces in FIG. 4 are partitioned into cycles of clk_hi 150, with a relative clock cycle number (time 0-19) listed along the top. It is assumed that the clocks are already running and stable at time 0.

As already mentioned, gear_hi 170 has a value of 9, and gear_lo 171 has a value of 4. It will be assumed in this example that block 312 of FIG. 3 has determined that gear_hi 170 is not less than twice the value of gear_lo 171 (i.e., 9 is not less than 4+4). Consequently, ld_val 342 has a value equal to gear_lo 171 (i.e., 4). In addition, as will become apparent at cycle 19 due to its cyclic nature, at time 0 gear_ratio_cnt 345 has a value of 9. At time 0, start signal 172 is asserted and selects ld_val 342 as input to flip-flop 304. Block 310 compares the value of gear_ratio_cnt 345 (9) to the value of gear_hi 170 (9). As gear_ratio_cnt 345 is greater than or equal to gear_hi 170, block 310 selects signal 336 as input to flip-flop 302, and selects logic value "1" for conveyance from multiplexer 320 as enable_d 322 input to flip-flop 308. At time 1, enable 121 is asserted. Also, at time 1, gear_ratio_cnt 345 assumes the value of 4, and gear_ratio_cnt_d 340 assumes the value 4 (i.e., signal 336 which is gear_ratio_cnt+gear_lo–gear_hi). The following table (Table 1) shows the changing values and assertion of enable signal 121 in accordance with the above description.

TABLE 1

| | Ratio of clk_hi 150 to clk_lo 152 = 9:4 | | | |
|---|---|---|---|---|
| Time | gear_ratio_cnt 345 | gear_ratio_cnt_d 340 | enable 121 | enable_d 322 |
| 0 | 9 | 4 | 0 | 1 |
| 1 | 4 | 8 | 1 | 0 |
| 2 | 8 | 12 | 0 | 0 |
| 3 | 12 | 7 | 0 | 1 |
| 4 | 7 | 11 | 1 | 0 |
| 5 | 11 | 6 | 0 | 1 |
| 6 | 6 | 10 | 1 | 0 |
| 7 | 10 | 5 | 0 | 1 |
| 8 | 5 | 9 | 1 | 0 |
| 9 | 9 | 4 | 0 | 1 |
| 10 | 4 | 8 | 1 | 0 |
| 11 | 8 | 12 | 0 | 0 |
| 12 | 12 | 7 | 0 | 1 |
| 13 | 7 | 11 | 1 | 0 |
| 14 | 11 | 6 | 0 | 1 |
| 15 | 6 | 10 | 1 | 0 |
| 16 | 10 | 5 | 0 | 1 |
| 17 | 5 | 9 | 1 | 0 |
| 18 | 9 | 4 | 0 | 1 |
| 19 | 4 | 8 | 1 | 0 |

As can be seen from FIG. 4 and the table above, enable signal 121 is asserted eight times during eight cycles of clk_lo 152. Accordingly, clk_hi 150 may sample new data eight times for transfer to the domain 104 corresponding to clk_lo 152. It is noted that the generation of the enable signal 121 is achieved by merely knowing the clock ratios (i.e., 9:4 in this example) and counting cycles of clk_hi 150. In addition, the method and mechanism described above works for any two ratios for clock signals derived from a common source.

Although the embodiments above have been described in considerable detail, numerous variations and modifications will become apparent to those skilled in the art once the above disclosure is fully appreciated. It is intended that the following claims be interpreted to embrace all such variations and modifications.

APPENDIX

```
/***********************************************************/
//      HDL For Generating Enable Signal for Two Clock Ratios
//      Copyright Sun Microsystems 2005
/***********************************************************/
//*************************************************************
// Module : sk gear
// Description : Generates an enable for every slow clock cycle for any two clock ratios.
//
// Tasks : None
// Functions : None
//*************************************************************
      module      sk_gear (clk, gear-ratio, start, enable);
      input       clk;
      input [15:0] gear-ratio;
```

APPENDIX-continued

```
input       start;
output      enable;
//************************* Local Declarations *************************//
reg         enable;
reg         enable_d;
reg [8:0]   gear_ratio_cnt_d, gear_ratio_cnt;
wire [7:0]  gear_low, gear_hi;
reg [7:0]   ld_val;
//************************* RTL Begin *************************//
assign gear_low = gear_ratio[7:0];
assign gear_hi = gear_ratio[15:8];
always @ (gear_ratio_cnt or gear_hi or gear_low)
begin
   if (gear_ratio_cnt >= { 1'b0, gear_hi})
      begin
         gear_ratio_cnt_d = (gear_ratio_cnt − { 1'b0, gear-hi } + { 1'b0, gear-low } );
         enable_d = 1'b1;
      end
   else
      begin
         gear_ratio_cnt_d = (gear_ratio_cnt + { 1'b0, gear_low } );
         enable_d = 1'b0;
      end
end always
always @ (posedge clk) begin enable <= enable_d; end
always @ (posedge clk)
begin
   if (start)
      gear_ratio_cnt <= { 1'bO, ld_val};
   else
      gear_ratio_cnt <= gear_ratio_cnt_d;
end always
always @ (posedge clk)
begin
   if ( (gear low+gear low) > gear hi )
      ld val <= gear hi;
   else
      ld val <= gear low;
end
endmodule
```

What is claimed is:

1. A data communications system comprising:
a source clock signal;
a first clock domain comprising a first clock signal which is derived from the source clock signal, wherein the first clock signal has a first frequency; and
a second clock domain comprising a second clock signal which is derived from the source clock signal, wherein the second clock signal has a second frequency which is different from the first frequency, and wherein a ratio of the first frequency to the second frequency is N:M;
wherein the first clock domain includes circuitry which is configured to:
receive values indicative of N and M;
initialize a count to N, in response to detecting N is less than 2*M; and
initialize the count to M, in response to detecting N is not less than 2*M;
wherein each cycle of the first clock signal, the circuitry is configured to:
add a value equal to (M−N) to the count and assert a sample enable signal, in response to determining the count is greater than or equal to N;
add a value equal to M to the count and negate the sample enable signal, in response to determining the count is not greater than or equal to N.

2. The system as recited in claim 1, wherein the first clock domain is configured to sample new data for transfer to the second domain when the sample enable signal is asserted.

3. The system as recited in claim 2, wherein the first clock domain is configured to hold data previously sampled data when the sample enable signal is negated.

4. The system as recited in claim 1, wherein the values N and M are programmable.

5. The system as recited in claim 1, wherein the first frequency is not an integer multiple of the second frequency.

6. The system as recited in claim 1, wherein the first frequency is an integer multiple of the second frequency.

7. The system as recited in claim 5, wherein the first clock domain is further configured to generate a reference clock signal, and wherein both the first frequency and the second frequency are an integer multiple of a frequency of the reference clock signal.

8. A method for generating a sample enable signal, the method comprising:
receiving a source clock signal;
generating a first clock signal with a first frequency in a first clock domain, wherein the first clock signal is derived from the source clock signal;
generating a second clock signal with a second frequency in a second clock domain,
wherein the second clock signal is derived from the source clock signal, and
wherein the second clock signal has a second frequency which is different from the first frequency, and wherein a ratio of the first frequency to the second frequency is N:M;

initializing a count to N, in response to detecting N is less than 2*M;

initializing the count to M, in response to detecting N is not less than 2*M;

each cycle of the first clock signal:

adding a value equal to (M−N) to the count and asserting a sample enable signal, in response to determining the count is greater than or equal to N;

adding a value equal to M to the count and negating the sample enable signal, in response to determining the count is not greater than or equal to N.

9. The method as recited in claim 8, wherein the first clock domain is configured to sample new data for transfer to the second domain when the sample enable signal is asserted.

10. The method as recited in claim 9, wherein the first clock domain is configured to hold data previously sampled data when the sample enable signal is negated.

11. The method as recited in claim 8, wherein the values N and M are programmable.

12. The method as recited in claim 8, wherein the first frequency is not an integer multiple of the second frequency.

13. The method as recited in claim 8, wherein the first frequency is an integer multiple of the second frequency.

14. The method as recited in claim 13, further comprising generating a reference clock signal in the first domain, wherein both the first frequency and the second frequency are an integer multiple of a frequency of the reference clock signal.

15. A circuit for generating a sample enable signal in a clock boundary crossing system, the circuit comprising:

an interface configured to receive a source clock signal;

an interface configured to receive values N and M, wherein N:M corresponds to a ratio of a first frequency of a first clock signal in a first clock domain to a second frequency of a second clock signal in a second clock domain;

an interface configured to receive the first clock signal;

a unit configured to:

initialize a count to N, in response to detecting N is less than 2*M; and initialize the count to M, in response to detecting N is not less than 2*M;

wherein each cycle of the first clock signal, circuitry configured to:

add a value equal to (M−N) to the count and assert a sample enable signal, in response to determining the count is greater than or equal to N;

add a value equal to M to the count and negate the sample enable signal, in response to determining the count is not greater than or equal to N.

16. The circuit as recited in claim 15, wherein the first clock domain is configured to sample new data for transfer to the second domain when the sample enable signal is asserted.

17. The circuit as recited in claim 15, wherein the values N and M are programmable.

18. The circuit as recited in claim 15, wherein the first frequency is not an integer multiple of the second frequency.

19. The circuit as recited in claim 15, wherein the first frequency is an integer multiple of the second frequency.

20. The circuit as recited in claim 19, wherein the first clock domain is further configured to generate a reference clock signal, and wherein both the first frequency and the second frequency are an integer multiple of a frequency of the reference clock signal.

* * * * *

UNITED STATES PATENT AND TRADEMARK OFFICE
CERTIFICATE OF CORRECTION

| | |
|---|---|
| PATENT NO. | : 7,627,065 B2 |
| APPLICATION NO. | : 11/316498 |
| DATED | : December 1, 2009 |
| INVENTOR(S) | : Schulz et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this

Second Day of November, 2010

David J. Kappos
*Director of the United States Patent and Trademark Office*